Oct. 4, 1966  S. KLEIN ETAL  3,277,321
STATIC CONVERTERS OF THERMAL ENERGY, IN PARTICULAR
OF NUCLEAR ORIGIN, INTO ELECTRIC ENERGY
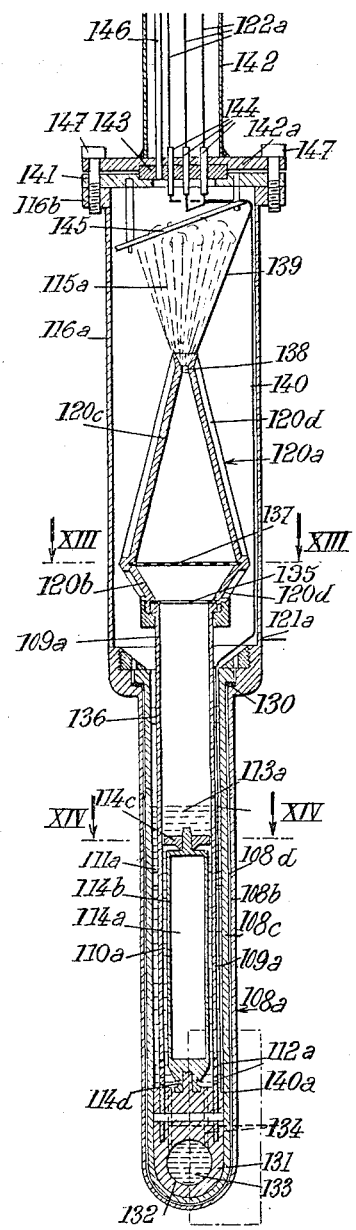
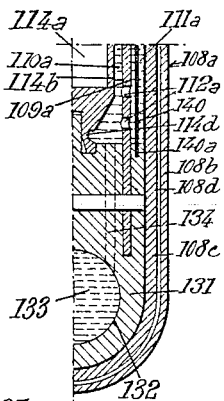
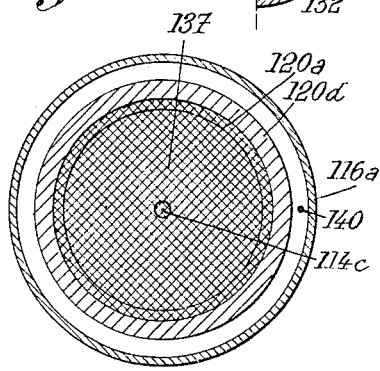
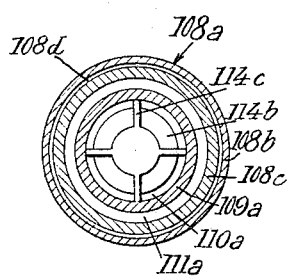

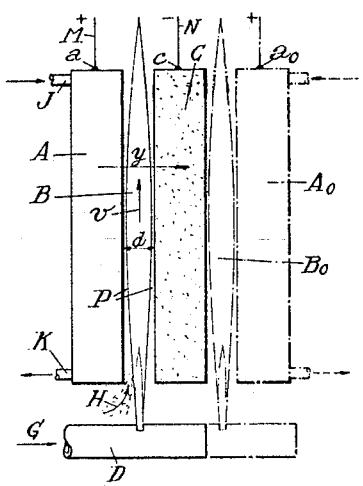
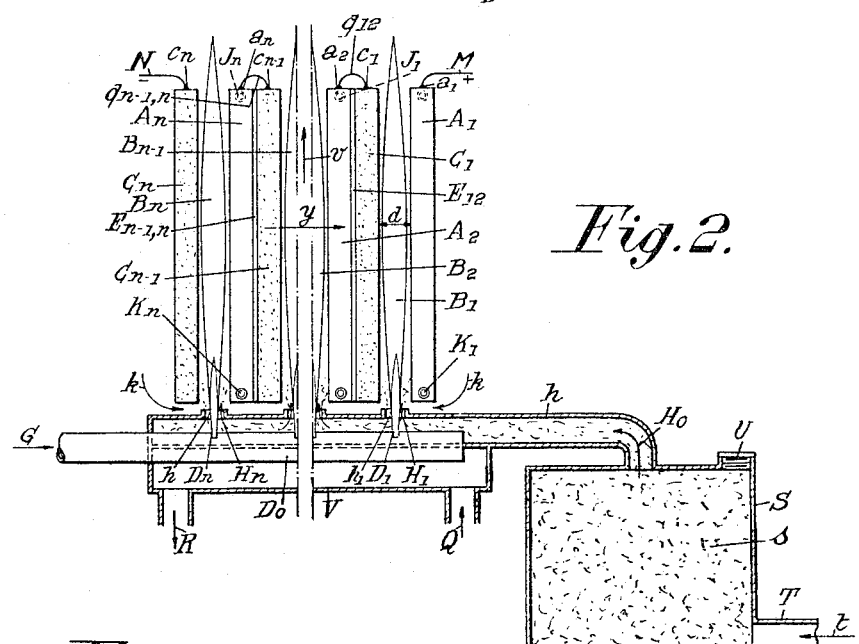
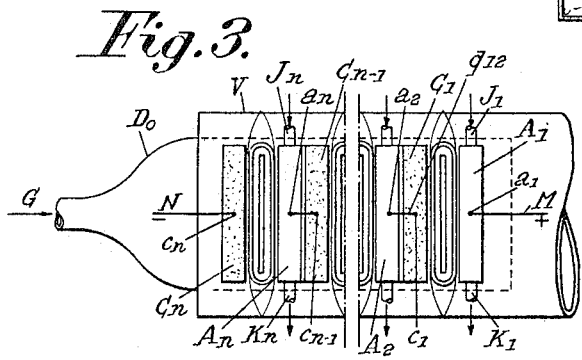

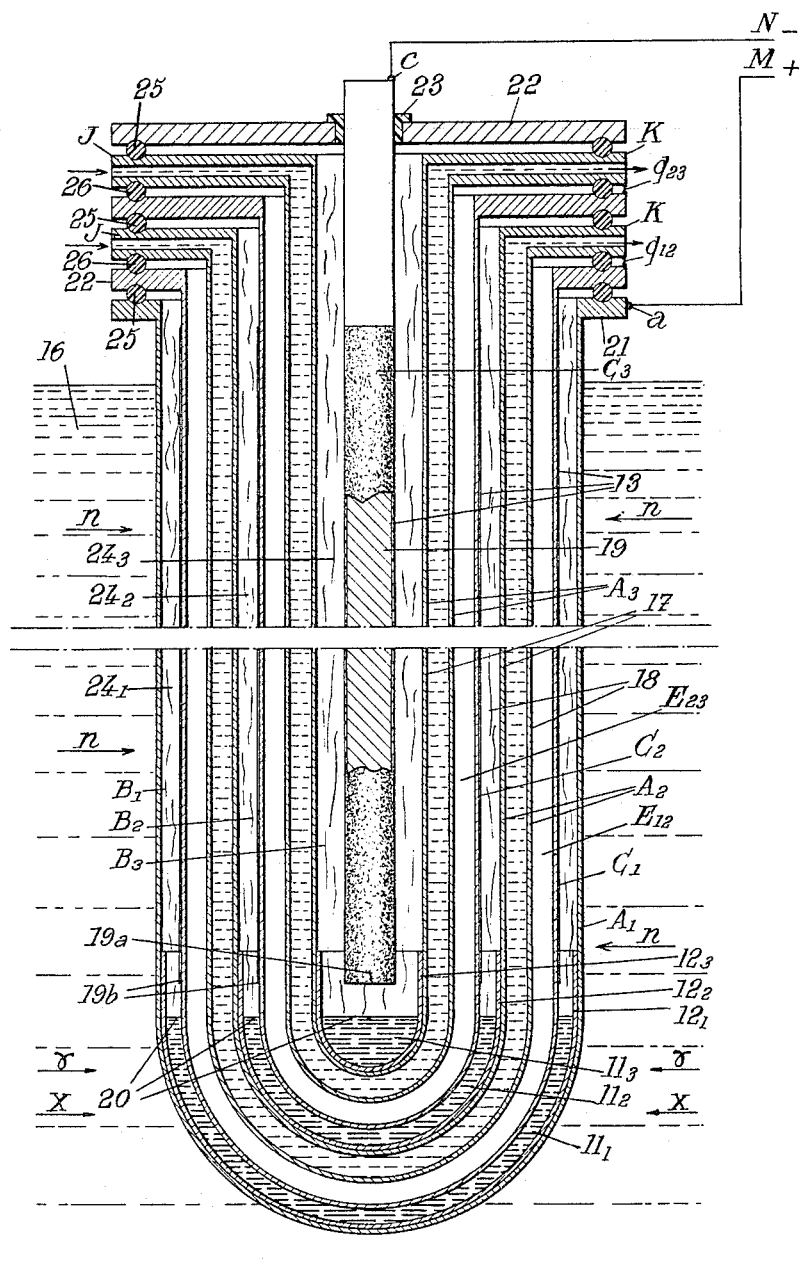

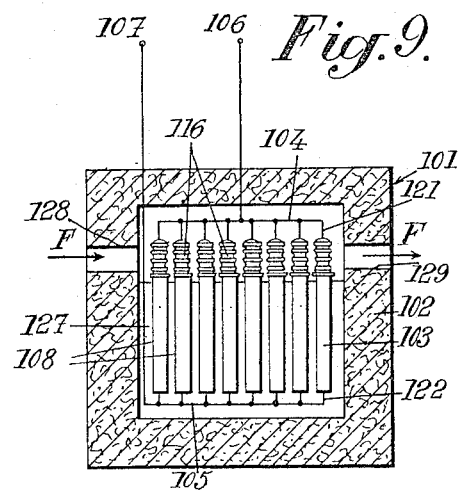
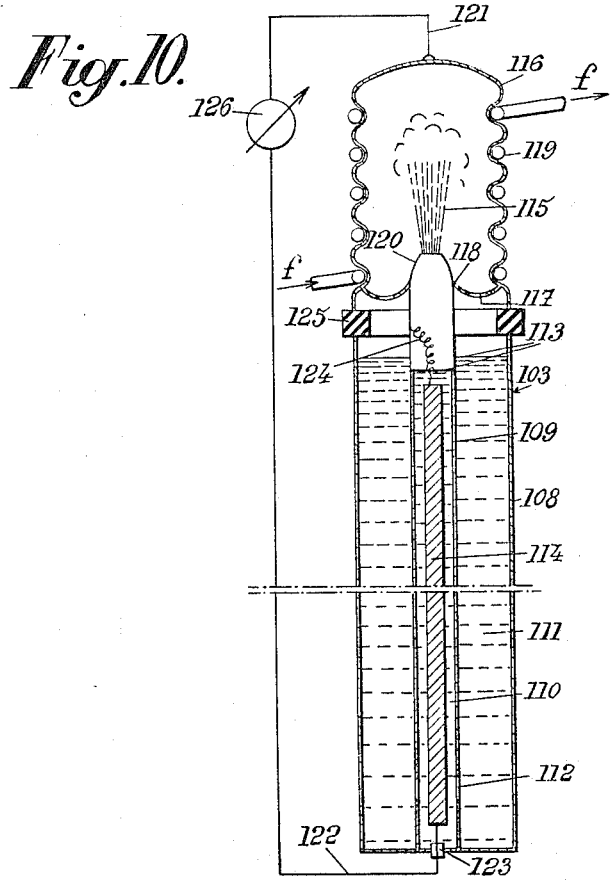

United States Patent Office 3,277,321
Patented Oct. 4, 1966

3,277,321
STATIC CONVERTERS OF THERMAL ENERGY, IN PARTICULAR OF NUCLEAR ORIGIN, INTO ELECTRIC ENERGY
Siegfried Klein, Paris, Maurice Surdin, Fontenay-aux-Roses, and Jacky Weill, Saint-Cloud, France, assignors to Commissariat a l'Energie Atomique, Paris, France, a French organization
Filed Mar. 14, 1963, Ser. No. 265,093
Claims priority, application France, Mar. 16, 1962, 891,393; Apr. 12, 1962, 894,307; Nov. 6, 1962, 914,561
24 Claims. (Cl. 310—4)

The present invention relates to static converters and method of conversion of thermal energy, in particular of nuclear origin, into electrical energy, that is to say to generators of electrical energy (generally in the form of direct current) which transform, directly and without moving parts, thermal energy, in particular of nuclear origin, into electrical energy. The invention is more particularly, but not exclusively, concerned with converters of the above mentioned kind intended to supply, from thermal and radiation energy developed in a nuclear reactor and without making use of a magnetic field, a relatively high voltage (averaging some tens or even some hundreds of volts for instance) and a substantial power (averaging some hundreds of kilowatts or even some megawatts).

It is an object of the present invention to provide a converter of the above mentioned type which is better adapted to meet the requirements of practice, in particular concerning the yield, the cost of the kilowatt, the voltage that is supplied, the available power and the efficient utilization of the thermal energy developed in a nuclear reactor.

The invention consists chiefly in providing, at the periphery of a thin hot ionized jet of vapor, at least one pair of electrodes, in cooling one electrode of said pair to a temperature lower than the temperature of condensation of the vapor, while the other electrode in said pair is at a temperature higher than said condensation temperature but lower than the temperature of copious thermionic emission of said other electrode, and in collecting between said the cooled electrode, which becomes positive, and said other electrode, which becomes negative, of said pair, the difference of potential that is obtained.

When a relatively high voltage is desired, we dispose, at the periphery of at least one hot thin ionized jet of vapor, a series of pairs of electrodes, each pair comprising a non-cooled electrode and a cooled electrode, in side-by-side relationship the non-cooled electrode of every pair (with the exception of that of the last pair) being placed in the immediate vicinity of the cooled electrode of the next pair and these adjacent electrodes of two successive pairs being thermally insulated from each other, advantageously by the interposition of a layer of a thermally insulating material such as a mica plate or an evacuated space. The non-cooled electrode of every pair (with the exception of that of the last pair) is electrically connected with the cooled electrode of the next pair, from which it is thermally insulated, and we collect between the cooled electrode of the first pair and the non-cooled electrode of the last pair a voltage equal to the sum of the elementary voltages produced in every pair of electrodes.

Of course, the portion of the thermal energy of the jet which has not been collected in the form of electrical power between the electrodes of the static converter according to the invention may be partly recovered through other means. For instance, it may be used to produce steam in a tubular boiler, this steam serving to operate a turbine which drives a conventional electric generator, in such manner as to use the thermal energy in the best possible condition. It might also be used in a gas turbine.

In a first series of embodiments of the invention, we dispose, on either side of an ionized jet of hot vapor or of a thin flame into which has been added a substance which can easily be vaporized and ionized, two electrodes, to wit one which is not cooled, for instance made of graphite, and one which is cooled by an internal circulation of water and which is made of a metal which is a good conductor of heat and electricity, such as copper.

In a second series of embodiments of our invention, we dispose in a nuclear reactor, preferably of the swimming pool type, a converter of the above mentioned type, the non-cooled electrode thereof being coated with a layer, preferably very thin, for instance averaging one hundred of a millimeter, of a fissionable product such as uranium or a compound thereof and we dispose, preferably in the vicinity of said non-cooled electrode, a mass of a vaporizable and ionizable substance, vaporization of this substance being essentially obtained by the heating, either direct or indirect, thereof by the radiations (X-rays and gamma rays) from the reactor, whereas heating of the non-cooled electrode is effected by the fission reactions produced in said layer by the neutrons of the reactor, and the jet of vapor resulting from this vaporizing is ionized by the ionizing particles and radiations produced by said reactor and from the fission reactions in said layer. Preferably the electrodes are disposed coaxially.

In a third series of embodiments of the invention, on the one hand the multiplying medium of a nuclear reactor comprises a great number of generator units electrically connected in shunt and/or in series to form a static converter capable of supplying direct current and, on the other hand, each of these units is made to comprise a container divided into two chambers opened at their tops and communicating together at their bottoms, a liquid disposed in this conainer, an element made of a fissionable material housed in the first of these chambers for heating and vaporizing the liquid contained therein so as to produce a jet of vapor which is ionized by the fission rays and particles, a condenser covering the whole of the upper part of these two chambers for condensing the jet of vapor issuing from the first chamber and sending it into the second chamber, this condenser comprising a cooled wall which constitutes a cold electrode whereas the surface of the upper portion of the first chamber, through which the ionized vapor jet flows out, constitutes or carries a hot electrode, and two conductors for collecting the direct voltage available between the cold electrode and the hot electrode. In particular, the different units may be disposed in a liquid bath, a portion of the heat given off in this bath by fissions serving to heat a heat conveying fluid which heats up while cooling the condensers of these units.

Preferred embodiments of the present invention will be hereinafter described with reference to the appended drawings, given merely by way of example, and in which:

FIG. 1 diagrammatically shows a static converter made according to the first series of the embodiments of the invention, for producing a low voltage averaging 1.5 volts;

FIGS. 2 and 3 show, respectively in side elevation partly in section and in plane view, a practical embodiment of such a converter comprising several pairs of electrodes in order to produce a higher voltage;

Figure 7:
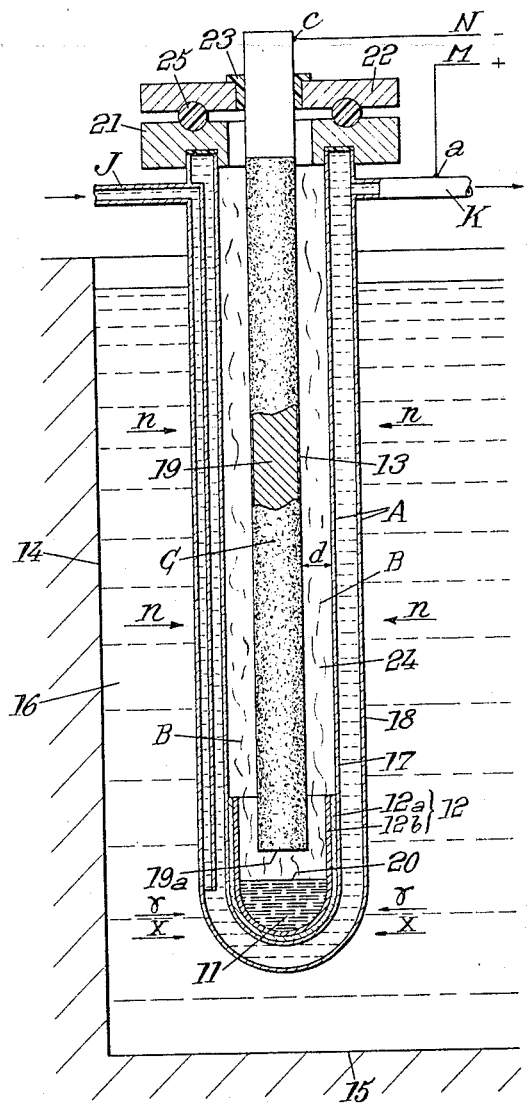

FIG. 7 diagrammatically shows, in section, with the exception of the non-cooled electrode, a static converter made according to the second series of the embodiments of the invention, disposed in a swimming-pool reactor and wherein the vaporizable and ionizable substance consists of sodium;

FIG. 8 is a view, analogous to FIG. 7, of a converter adapted to produce a high voltage owing to the use of a great number of electrodes, this converter being also disposed in a swimming-pool reactor, but the vaporizable substance consisting of mercury;

FIG. 9 diagrammatically shows, in partial section, an energy converting nuclear reactor provided with the improvements according to the present invention and made according to the third series of embodiments of said invention;

FIG. 10 is a longitudinal section through one of the generator units of the reactor of FIG. 9, on an enlarged scale;

FIG. 11 is a longitudinal sectional view of another construction of a generator unit also made according to the third series of embodiments of the invention;

FIG. 12 is a view on an enlarged scale of the portion of FIG. 11 located in the rectangle in dot-and-dash lines of said FIG. 11;

FIGS. 13 and 14 are cross sections, respectively on the lines XIII—XIII and XIV—XIV, of FIG. 11.

We will first refer to FIG. 1 which diagrammatically illustrates the case of a single pair of electrodes and permits of getting a broad idea of the present invention.

We dispose, at the periphery P of a thin ionized jet (or plasma jet) of vapor consisting for instance, in this case, of a laminar or thin flame B into which is introduced an easily vaporizable and ionizable substance (for instance by projecting into this flame such a substance, which may be potassium chloride or carbonate), a pair of electrodes A, C. We cool down one electrode A of this pair to a temperature lower than the temperature of condensation of the vapor of the jet or of the easily vaporizable and ionizable substance, and we collect across these electrodes A, C, at their terminals $a$, $c$, through conductors M, N, the potential difference between them. As a matter of fact, the cooled electrode A becomes positive with respect to the non-cooled electrode C.

It will already be noted that we obtain a polarity which is the reverse of that obtained in a plasma thermionic generator (with cesium atmosphere), because in a thermionic generator the heated electrode (cathode) gives off electrons and therefore becomes positive, whereas the cooled electrode (anode) collects the electrons and therefore becomes negative.

Separation of the electric charges (positive ions and electrons) from the plasma of the jet or flame takes place, in a generator according to the invention, in the absence of a magnetic field, merely due to the difference of temperature between electrode C (which is heated by the hot jet or flame and electrode A (which is cooled down to a temperature ensuring condensation of the vapors and therefore collection of the positive ions), the hot electrode C becoming negative and the cooled electrode A positive.

For instance we may dispose, on either side of the thin flame B produced by a burner D (fed with gas or fuel oil G) and into which has been introduced an easily vaporizable and ionizable substance (such as potassium chloride or carbonate) arriving together with the oxidizer (air or oxygen), as shown by arrow H, two electrodes, to wit a non-cooled electrode C made of graphite and a hollow electrode A, cooled by a circulation of water (arriving at J and leaving at K) and made of a metal which is a good conductor of heat and electricity, such as copper. In this case, we obtain, between terminals $a$ and $c$, a potential difference averaging 1.5 volts, the intensity and therefore the available power depending, among other factors, upon the difference of temperature between electrodes A and C, upon their dimensions, upon their relative position, and also upon the velocity and degree of ionization of the jet or flame.

It has been found that only the periphery of flame B in contact with electrodes A and C serves to the production of electrical energy through the effect brought into play in the converter according to the present invention. This effect may be called calorelectric effect to differentiate it from the thermo-electric or Seebeck effect acting in plasma thermocouples and which produces (for the non degenerated electronic gases which occur in plasmas) a difference of potential of less than 0.01 volt per hundred of centigrade degrees of temperature difference. The calorelectric effect according to the invention produces a result which, in order to be obtained through the thermo-electric or Seebeck effect, would require a temperature difference of more than 15,000° C. to supply a voltage of 1.5 volts. The hot electrode C is heated by the periphery of the flame whereas, for the cold electrode A, it is the thin gaseous flame layer arriving in contact with this electrode that seems to be the seat of the electromotive force created by said effect. Consequently the thermal energy of the central portion of the flame is not used according to the present invention and this is why, according to an important feature thereof, we may make use of thin or laminar flames or jets, which considerably increases the efficiency.

Contrary to what was stated in the French Patent No. 1,267,863 filed by the Commissariat a l'Energie Atomique on June 13, 1960, the plasma or ionized gas must not necessarily be in the form of a very fast and even supersonic jet to produce a substantial potential difference. What is on the contrary necessary is the existence of a cooled electrode (which becomes positive) immersed in the ionized gas, the other electrode (which is not cooled) being at a temperature lower than the thermionic emission temperature (as otherwise, the calorelectric effect according to the invention would be partly compensated for by the thermionic effect).

In many applications, it is necessary to obtain voltage differences greater than 1.5 volts. In this regard, it should be noted that is not possible to double the available potential difference by providing, for instance as shown in dot-and-dash lines in FIG. 1 another electrode $A_0$ disposed at the periphery of a second flame $B_0$ also flowing along electrode C in such manner as to form a second pair C–$A_0$. As a matter of fact the terminal $a_0$ of the cold electrode $A_0$ is brought, when this electrode is cooled down, to the same positive potential (1.5 volts), with respect to the terminal $c$ of electrode C, as the terminal $a$ of electrode A. Therefore no potential difference can be collected between terminals $a$ and $a_0$.

On the contrary we found that it was possible to obtain voltages much higher than 1.5 volts by disposing side by side several pairs of electrodes of the type shown in solid lines on FIG. 1 and by thermally insulating these electrodes and connecting them in a particular manner.

More especially, when it is desired to obtain a relatively high voltage, we proceed as follows:

We dispose (FIGS. 2 to 6) at the periphery of at least one thin hot ionized jet of vapor, for instance in at least one laminar flame into which has been introduced an easily vaporizable and ionizable substance, for instance in thin flames $B_1$, $B_2$, $B_3$, . . . $B_{n-2}$, $B_{n-1}$, $B_n$, a series of pairs of electrodes $A_1$–$C_1$, $A_2$–$C_2$, $A_3$–$C_3$, . . . $A_{n-1}$–$C_{n-1}$, $A_n$–$C_n$, each consisting of a non-cooled electrode $C_1$, $C_2$, $C_3$, . . . $C_{n-1}$, $C_n$ and of a cooled electrode $A_1$, $A_2$, $A_3$, . . . $A_{n-1}$, $A_n$, the non-cooled electrode of every pair (with the exception of the non-cooled electrode $C_n$ of the last pair) being placed in the immediate vicinity of the cooled electrode of the next pair and the adjacent electrodes of two successive pairs (electrodes $C_1$ and $A_2$, $C_2$ and $A_3$, . . . $C_{n-1}$ and $A_n$) being thermally insulated from each other, for instance by the interposition of a layer $E_{12}$, $E_{23}$, . . . $E_{n-1,n}$ of a material which is a thermal insulator, for instance of a mica plate;

The non-cooled electrode of every pair (with the exception of the non-cooled electrode $C_n$ of the last pair) is electrically connected with the cooled electrode of the next pair, to which it is adjacent but from which it is thermally insulated for instance by connecting through conductors $q_{12}$, $q_{23}$ . . . $q_{n-1,n}$ the terminals $c_1$ of $C_1$, $c_2$ of $C_2$, . . . $c_{n-1}$ of $C_{n-1}$ to the terminals $a_2$ of $A_2$, $a_3$ of $A_3$, . . . $a_n$ of $A_n$ respectively; and We collect, between the cooled electrode of the first pair (terminal $a_1$) and the non-cooled electrode of the last pair (terminal $c_n$) through conductors M, N, a voltage equal to the sum of the elementary voltages created by every pair of electrodes.

Thus when there are fifty pairs of electrodes ($n=50$) on either side of fifty laminar flames, we obtain $1.5 \times 50 = 75$ volts across terminals $a_1$ and $c_n$.

Figure 4:
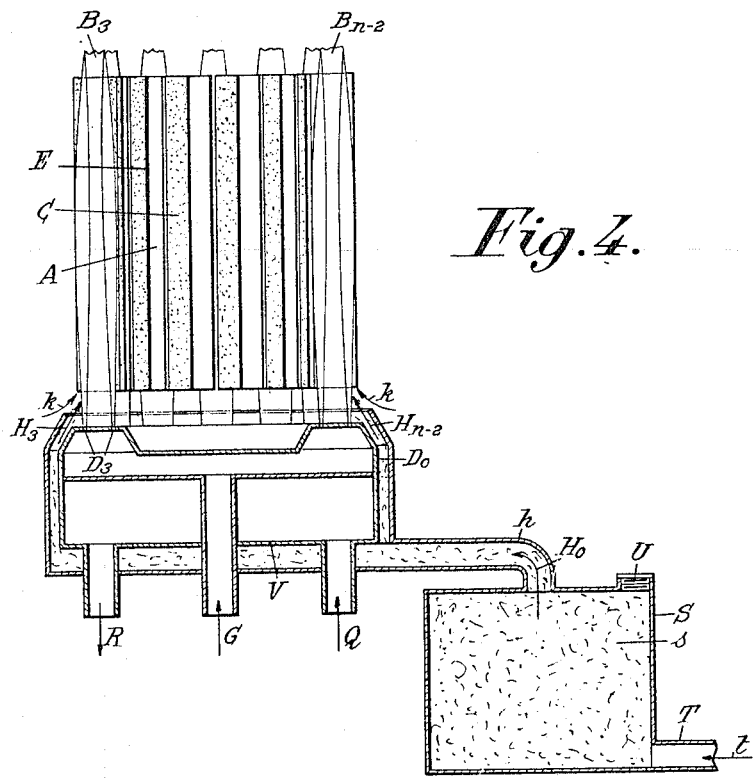
FIGS. 4 and 5 show, respectively in side elevation partly in section and in plane view, another embodiment of such a converter.
Figure 6:
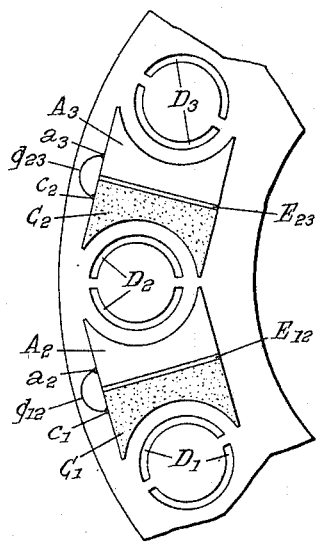
FIG. 6 shows a portion of FIG. 5 on an enlarged scale.
Figure 5:
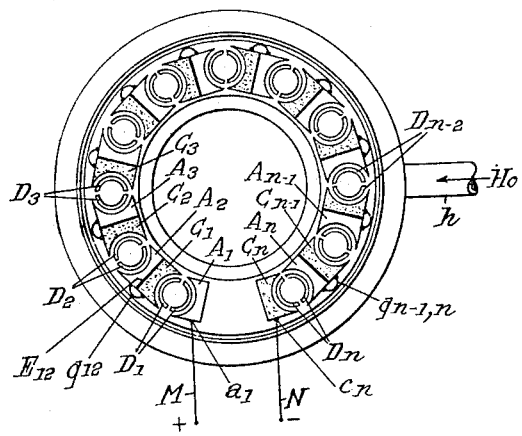

The flames may consist for instance of flat parallel sheets produced by city gas, acetylene, butane, propane, fuel oil, and the like, as shown by FIGS. 2 and 3. They may also consist of substantially cylindrical sheets disposed in a circular row as illustrated by FIGS. 4 to 6. They may also consists of cylindrical flames of small diameter. In FIGS. 2–3 and 4–6 the same reference numerals have been used to designate corresponding elements.

In the two embodiments above mentioned, a feed container $D_0$ is provided with orifice $D_1$, $D_2$, $D_3$, . . . $D_n$ either rectilinear (FIGS. 2 and 3) or semi-circular (FIGS. 4 to 6). In both cases these orifices are narrow so as to produce thin blades of flames providing a high conversion efficiency. In view of the fact that the invention is concerned with high power apparatus, therefore giving off a great number of calories, it is preferable to cool down container $D_0$, for instance by means of a circulation of water through a box V adjacent to said container, the cooling water arriving in the direction indicated by arrow Q and flowing out in the direction indicated by arrow R.

In order to introduce into every flame the vaporizable and ionizable substances, we make use of vessel S at the bottom of which there is provided a powder $s$ of an easily vaporizable and ionizable product, such as potassium chloride or carbonate in fine powder, this powder being introduced through an orifice fitted with a plug U. Through this vessel S we circulate a violent stream of air, or preferably of oxygen, arriving through tube T in the direction of arrow $t$. This air or oxygen stream fluidizes the powder $s$ in vessel S and a stream $H_0$ of air or oxygen with potassium chloride or carbonate in suspension therein is driven out through pipe $h$. This pipe is provided, opposite the orifices $D_1$, . . . $D_n$ of container $D_0$, with holes $h_1$, . . . $h_n$, through which escape streams $H_1$, . . . $H_n$ of the oxidizer (air or oxygen) containing potassium chloride or carbonate in suspension therein. Flames $B_1$, . . . $B_n$ vaporize and ionize this potassium salt, thereby providing a high ionizing degree of the flames which get rich in ions and electrons, thus considerably increasing the rate of conversion of the thermal energy of the flames into electrical energy available between terminals $a_1$ and $c_n$. Supplementary air may arrive along arrows $k$.

The height of the pairs of electrodes in the vertical direction of FIGS. 1, 2 and 4 is chosen in such manner as to permit of collecting at least a substantial portion (if not the whole) of the electrons and ions available in the flames or jets arriving between the electrodes of the pairs. Now the percentage of ions and electrons to be collected increases when the height L of the electrodes increases, when the distance $d$ between the electrodes decreases and when the rate of flow $v$ of the ionized gases along the walls of the electrodes decreases. It may be shown that practically all charged particles (ions and electrons) are collected when $x \times d/L$ is equal to or smaller than W, W being the velocity of the ions acquired under the action of the internal electric field of the generator (i.e. W is the mean speed of the ions towards the cooled electrodes). For practical purposes, it is uneconomical to increase L or to reduce $v$ and/or $d$ to values such that $v \times d/L$ is smaller than W, because practically no electric charges are recovered when $v \times d/L$ keeps decreasing below W; on the contrary, neutral vapors (without charged particles) are cooled down and condensed and thermal energy is lost without being transformed directly into electricity in the generator according to the invention. Therefore the best results are obtained when $v \times d/L$ is substantially equal to W.

Now it is possible to recover through conventional means a portion of the energy of the jet or flame that is not transformed into electricity, in the generator according to the invention. We may for instance use said energy to produce steam in a tubular boiler, this steam serving to operate a turbine which drives a conventional electric generator. In this case, we dispose, above the system of burners and electrodes of FIG. 2 and/or FIG 4, a steam generator (not shown). In a modification, we may directly use the hot gases flowing upwardly from the device of FIG. 2 or FIG. 4 in a gas turbine (also not shown).

In both of these cases (tubular boiler or gas turbine) the proportion $z$ of the hot neutral molecules lost for the second stage of the thermal energy utilizing system (to wit the stage consisting of the steam generator or the gas turbine) under the effect of condensation on the cooled electrodes is given, in the case where $v \times d/L = W$, by $z = W_y/W$. $W_y$ being the mean speed of thermal agitation (or diffusion) of the neutral molecules in direction $y$ (FIG. 2). In the particular case of oxy-hydrogen blowtorch, it is possible to estimate $z$ substantially to 30%.

In the second series of embodiments of the invention (illustrated by FIGS. 7 and 8), we create direct current, as in the first series of embodiments (illustrated by FIGS. 1 to 6), by disposing, at the periphery of at least one thin hot ionized jet of vapor or plasma jet (the formation of which will be hereinafter described), at least one pair of electrodes A, C, we cool down (for instance by means of a circulation of water flowing in at J and flowing out at K) the electrode A, to a temperature lower than the temperature of condensation of the jet, and we collect current between electrodes A and C at terminals $a$, $c$ through conductors M, N, the cooled electrode A becoming positive with respect to the non-cooled electrode C during the operation. The reference letters in FIGS. 7 and 8 correspond to those used in FIGS. 1 to 6 for equivalent elements. In this case also, contrary to what takes place in converting diodes of the plasma type, the cooled electrode becomes positive with respect to the hot electrode.

The jet of ionized vapor, or jet of hot plasma, may be obtained for instance by means of a mass 11 of sodium (boiling point 880° C. under ordinary pressure) in the embodiment of FIG. 7 or of mercury (boiling point 357° C. under atmospheric pressure) as in the embodiment of FIG. 8. We may of course make use of another vaporizable and easily ionizable substance such as water, cesium or potassium. Mass 11 is located in a receiver 12 disposed close to the non-cooled electrode C.

In order to perform vaporization and ionization of mass 11 and to heat the non-cooled electrode C, this last mentioned electrode is coated with a very thin layer 13 (for instance averaging one hundred of a millimeter) of a fissionable product such in particular as uranium oxide or carbide. We may also make use of uranium or another uranium compound. The whole of the pair of electrodes A, C and receiver 12 together with mass 11 is disposed in a nuclear reactor, preferably of the swimming-pool type (in FIG. 7 we have illustrated one end of this reactor, the wall 14 and the bottom 15 of which are visible), the moderator consisting of a mass 16 of light or heavy water.

In the embodiment illustrated by FIG. 7 the cooled electrode A has the shape of a glove finger and it consists of two walls 17 and 18 between which circulates the cooling water flowing through tube J and flowing out through tube K. Receiver 12 is housed in the lower portion of electrode A. When the substance to be vaporized is mercury, this receiver 12 is advantageously made of quartz (FIG. 8) whereas when this substance is sodium or another alkali metal, this receiver is preferably made of two portions, to wit a quartz portion forming a receptacle 12a and a steel portion forming a crucible 12b and housed in said receptacle 12a. The non-cooled electrode C disposed coaxially with respect to the cooled electrode A consists of a cylindrical piece 19, for instance of steel, coated with a layer of uranium or a compound thereof (uranium carbide or oxide for instance) the lower end 19a of electrode C preferably arriving at little above the level 20 of mass 11, in the liquid state.

The cooled electrode A is fixed to a ring 21 and the non-cooled electrode C is rigid with a ring 22, a plug 23 of an insulating material being interposed between electrode C and ring 22. Finally an O-ring gasket 25 is provided between rings 21 and 22 so as to prevent the outflow of vapor from the annular space 24 between electrodes A and C (the thickness d of this space averaging for instance one centimeter).

The operation of the device described with reference to FIG. 7 is as follows:

Swimming-pool reactor 14, 15, 16 being in operation, (a) the high energy radiations (X-rays and gamma rays) thereof heat crucible 12b, which has for its effect to melt and to vaporize the sodium mass 11, insulating envelope 12a forming a separation between said hot crucible 12b and the cooled electrode A;

(b) the neutrons of the reactor, slowed down by the mass of moderator 16, produce fission reactions in layer 13; this produces a heating of cylindrical bar 19 which forms electrode C;

(c) the ionizing radiations and particles of the reactor, and also those produced by fissions in layer 13, strongly ionize the sodium vapors which rise up in annular space 24, thus producing a thin ionized vapor jet which ascends in space 24.

As above indicated with reference to FIGS. 1 to 6, this jet of vapor B passes between a non-cooled electrode C and a cooled electrode A. The electrons of this jet are slowerd down in the vicinity of the cooled electrode A and charge this electrode at a negative potential, lower in absolute value than that to which they charge the non-cooled electrode C. Thus a difference of potential is formed by a calorelectric effect, as above explained.

Finally, a potential difference is produced between conductors N and M. As for the sodium vapor of jet B, it condenses over the whole of the cooled surface of space 24 and drops back into vessel 12.

In order to obtain a correct operation of the device of FIG. 7, the ionized fluid must be condensable (vapor) and this fluid must actually be condensed on the cooled electrode A, the hot electrode C being at a temperature lower than its thermionic emission temperature.

In order to increase the heating and ionizing power of layer 13, it is of interest to give it the maximum area and this is why it is interesting to give bar 19, which forms electrode C, a suitable geometric form, by providing it for instance with ribs or screw threads. Generally, for instance through a suitable choice of the thickness of layer 13, the temperature of bar 19 is made to range from 300° C. to 600° C. during the operation.

Concerning the cooled electrode A, it may be noted that, in a modification, instead of giving it the form of a double wall inside which a cooling fluid such as water is circulated, electrode A may consist of a single wall, such as 17, dipping directly in the swimming-pool reactor, the mass of light or heavy water of this reactor being sufficient to keep electrode A or 17, at a temperature lower than the temperature of condensation of substance 11 (for the water of a swimming-pool reactor is generally kept at a temperature of about 55° C.). This modification is used in the construction of FIG. 8.

If it is desired to obtain important voltage differences, we provide a series of electrode pairs A–C each including a non-cooled electrode $C_1$, $C_2$, $C_3$ and a cooled electrode $A_1$, $A_2$, $A_3$. The non-cooled electrode of every pair (with the exception of that of the last pair) is placed in the immediate vicinity of the cooled electrode of the next pair and these adjacent electrodes of two successive pairs are directly insulated from each other, advantageously by providing between them a space $E_{12}$, $E_{23}$ as perfectly evacuated as possible. We electrically connect through conductors $q_{12}$, $q_{23}$ the non-cooled electrode of every pair (with the exception of the electrode $C_3$ of the last pair) with the cooled electrode of the next pair, adjacent thereto but directly insulated therefrom. We collect, across the cooled electrode $A_1$ of the first pair and the non-cooled electrode $C_3$ of the last pair, a voltage equal to the sum of the elementary voltages produced by every pair of electrodes.

Of course, we might make the pairs of electrodes as illustrated by FIG. 7 and dispose them side by side, but it is more advantageous to provide, as shown by FIG. 8, coaxial electrodes surrounding one another.

In the embodiment of FIG. 8 the cooled electrode $A_1$ consists of a mere tube having a semi-spherical bottom fixed in an annular ring 21 and dipping in the mass 16 of light or heavy water of a swimming-pool reactor, which keeps it at a sufficiently low temperature to permit condensation of the mercury vapor. The cooled electrodes $A_2$ and $A_3$ consist, as in the embodiment of FIG. 7, of two walls 17 and 18 between which flows the cooling water arriving through tubes J and leaving through tubes K. The non-cooled electrode $C_3$ is made as the electrode C of the construction of FIG. 7 and is heated up at a temperature ranging from 300° C. to 600° C. during the operation. As for the non-cooled electrodes $C_1$ and $C_2$, each of them consists of a tube having a semi-spherical bottom and the outer surface of which is coated with a thin layer 13 of uranium or an uranium compound so as to be also brought to a temperature ranging from 300° C. to 600° C. by the fissions produced in this layer by slow neutrons coming from the reactor.

Inside the lower portion of every cooled electrode there is housed a receiver $12_1$, $12_2$, $12_3$ containing a small mass of mercury $11_1$, $11_2$, $11_3$. Preferably the mercury level 20 in these receivers is below the lower end of the layer of fissionable product, that is to say 19a for electrode $A_1$ and 19b for electrodes $C_1$ and $C_2$. Receivers $12_1$, $12_2$, $12_3$ are made of a material which is insulating from the electrical and thermal points of view, such as quartz, so as to insulate the electrodes from one another both electrically and thermally.

As in the construction of FIG. 7, O-ring gaskets 25 are provided between the cooled electrode and the non-cooled electrode of every pair. Furthermore, O-ring gaskets 26 are provided between the non-cooled electrode and the cooled electrode adjacent thereto so as to keep between said electrodes the high vacuum that has been initially provided in this space.

Finally we dispose conductors $q_{12}$ and $q_{13}$ for connecting electrode $C_1$ to electrode $A_2$ and electrode $C_2$ to electrode $A_3$, respectively. As in the construction of FIG. 7, conductors M and N permit of collecting the potential difference available at the terminals a and c of electrodes $A_1$ and $C_3$, respectively.

The operation of the device of FIG. 8 is analogous to that of the device of FIG. 7. The slow neutrons n of the swimming-pool reactor produce fissions in the layers 13 of electrodes $C_1$, $C_2$ and $C_9$. At the same time, the X-rays and gamma rays of the reactor produce a heating of the small mercury masses $11_1$, $11_2$, and $11_3$ which causes a partial vaporizing thereof. Mercury vapors rise through annular spaces $24_1$, $24_2$ and $24_3$, where they are strongly ionized by the particles and radiations from the swimming-pool reactor and from the fissions in layers 13. We thus obtain ionized thin hot jets $B_1$, $B_2$, $B_3$ of vapor in spaces $24_1$, $24_2$, $24_3$, this vapor condensing on the cooled electrodes $A_1$, $A_2$, $A_3$, so that, by calorelectric effect, potential differences are produced between the electrodes of every pair. The different pairs of electrodes being connected in series through conductors $q_{12}$ and $q_{13}$, we obtain, between terminals $a$ and $c$, a potential difference equal to the sum of the elementary potential differences available on every pair of electrodes.

According to the third series of embodiments of the invention (FIGS. 9 and 10), the multiplying medium of a nuclear reactor 101 (FIG. 9) the shield of which has been diagrammatically shown at 102, comprises a multiplicity of generating units 103 connected electrically, either in shunt and/or in series, through conductors 104, 105 so as to form a static converter supplying a direct current across terminals 106 and 107.

As shown by FIG. 10 each of the units 103 comprises the following elements:

A container 108 divided by a partition 109 into two chambers 110 and 111, for instance concentric to each other, said chambers being open at their upper ends and communicating together at their lower ends through orifices 112 provided in partition 109;

A liquid 113 (for instance a neutrons slowing down moderator liquid, such as heavy or light water, sodium, potassium or an alloy of sodium and potassium in the molten state) disposed in this container 108;

An element 114, for instance of cylindrical shape, made of a fissionable material (in particular enriched uranium or a compound thereof), housed in chamber 110 for heating and vaporizing the liquid 113 contained therein (this liquid filling approximately chambers 110 and 111) thus producing a vapor jet 115 which is ionized by the fission radiations and/or particles;

A condenser 116 covering the whole of the upper portions of said chambers 110 and 111 so as to condense the vapor jet 115 issuing from chamber 110 to send it back into chamber 111 through orifices 117 provided in partitions 118, this condenser 116 comprising a surface cooled for instance by a coil 119 through which a liquid or a gas, in particular water, is circulated in the direction of arrows $f$; this cooling may be obtained by a fluid stream F as shown by FIG. 9; the cooled area of this condenser constitutes a cold electrode;

The upper portion 120 of the first chamber 110, through which the vapor jet issues and which in the form of a nozzle, constitutes a hot electrode; and Two conductors 121, 122 for collecting the direct voltage available between the positive cold electrode 116 and the negative hot electrode 120, conductor 122 passing through the bottom of container 108 with the interposition of an insulator 123.

A conductor 124 serves to connect element 114 to the hot electrode 120. Finally a gasket 125 of an electrically insulating material, is inserted between container 108 and condenser 113 so as to form and insulating separation between the cold and hot electrodes, respectively.

In FIG. 10 we have shown at 126 an apparatus for measuring the current that is supplied, in order to permit adjustments, whereas in FIG. 9 we have shown the actual connections (in shunt) of units 103 to obtain the desired potential difference between terminals 106 and 107.

The units 103, such as shown by FIG. 10, may be disposed in the reactor (FIG. 9) either side by side or preferably by immersing them, with the exception of condensers 116, in a liquid 127, as shown by FIG. 9. Furthermore, we may, in the arrangement of FIG. 9, provide a circulation of heat transfer fluid (for instance carbon dioxide under pressure) at the level of condensers 116, this fluid, which arrives through conduit 128 and flows out through conduit 129, as shown by arrows F, being heated, while cooling condensers 116. The heat energy transported by said fluid is used in the manner known for power reactors.

We may consider, as a rule, two types of nuclear reactors for applying the arrangement illustrated by FIGS. 9 and 10:

Thermal reactors, that is to say reactors wherein use is made of slow or thermal neutrons for producing fissions; in this case the moderator liquid 113 consists of light water or heavy water and it is advantageous to use also light water or heavy water to constitute liquid 127 if it exists;

Fast reactors, that is to say reactors of the type for producing fissions with fast neutrons which have not been slowed down and in this case liquid 113 may advantageously consist of sodium, potassium or a sodium and potassium alloy such as the eutectic alloy, the external liquid 127, if it exists, being preferably in this case sodium, potassium or a sodium and potassium alloy.

The operation of the apparatus described with reference to FIGS. 9 and 10 is as follows:

The neutrons produced by the multiplying medium constituted by elements 114 (the mass of nuclear fuel, that is to say of fissionable material being greater than the critical mass so that the reactor can diverge) whether these neutrons are fast neutrons in the case of a fast reactor or slow neutrons in the case of a thermal reactor, produce a heating of the liquid 113 contained in chamber 110. This liquid starts boiling at the upper part of this chamber and flows out through nozzle-shaped electrode 120, in the form of a vapor jet 115. The ionizing radiations and particles of the reactor strongly ionize the vapor forming jet 115.

As in the preceding embodiments, this ionized vapor jet 115 of low internal electric resistance passes between a hot electrode 120 and a cooled electrode, on which the vapor condenses, this cooled electrode consisting of the walls of condenser 116. The electrons of jet 115 are slowed down in the vicinity of the cooled electrode and consequently charge the walls of the condenser to a negative potential of an absolute value smaller than that to which they charge the hot electrode 120, so that a potential difference is produced by a calorelectric effect as above stated. Finally a potential difference is available between conductors 121 and 122 (FIG. 9), the sum of the potential differences between the respective units 103 being available between the terminals 106 and 107 of FIG. 9 owing to the shunt mounting of the respective units. As for the potential of containers 108, it may be either floating or fixed by means of suitable connection.

As for the vapor jet, it cools down and condenses on the walls of condenser 116 and the condensed liquid drops back through orifices 117 into chamber 111. From this chamber it passes back into chamber 110 through the holes 112 provided in partition 109. Preferably, this partition is made of a thermally insulating material so as to avoid cooling of the liquid 113 contained in chamber 110 by the liquid contained in chamber 111.

Another more elaborate embodiment of a generator according to this third embodiment of the invention is illustrated by FIGS. 11 to 14 inclusive.

In this embodiment, a generator unit comprises a receiver 108a in the form of a glove finger, consisting of two layers, to wit an external layer 108b made of steel and an internal layer 108c made of alumina (thermal and electric insualtor) separated from each other by a layer 108d of air insulated from the outside by a low pressure gasket 130 made of polyethylene. This receiver 108a is divided by a cylindrical wall 109a, also of alumina, into two coaxial chambers 110a and 111a which are open at their upper ends and communicate with each other at their lower ends through orifices 112a provided in partition 109a. A liquid 113a, in particular a liquid capable of slowing down neutrons, such as heavy or light water, is disposed in chambers 110a and 111a. In the liquid of chamber 110a there is housed a bar 114a of uranium (either natural or enriched in the $U_{235}$ isotope) surrounded by a sheath 114b (for instance of an aluminum or magnesium alloy), this sheath being provided, at its upper end, with a cross shaped centering member 114c and, at its lower end, with a foot 114d fixed in an aluminum support 131 which comprises a recess 132 filled with a volume 133 of moderator liquid. Recess 132 communicates, through channels 134, with chamber 110a.

Container 108a extends upwardly so as to form a sheet iron casing 116a containing the cold electrode or condenser, means (not shown) for instance means ensuring circulation of a heat transfer fluid, being provided to cool down this casing.

Inside casing 116a there is a nozzle 120a carried by partition 109a (which extends upwardly), a packing ring 135, made of lead, being provided between the upper end of partition 109a and the lower end of nozzle 120a. A ring 136 serves to center partition 109a in receiver 108a. Nozzle 120a consists of two contiguous cone frustums 120b and 120c, superposed to each other, made of stainless steel covered on the outside by a layer 120d of alumina. A metal grid 137 is mounted between the two cone frustums. Nozzle 120a, which is provided with an outlet orifice 138 of small diameter, carries a metal rod 139 which constitutes the hot electrode. This metal rod is completed by a vertical metal rod 140 the lower part of which dips into the moderator liquid of chamber 110a and the lower end 140a of which is fixed in the aluminum support.

Casing 116a is provided with a flange 116b on which is fixed, with the interposition of a washer 141, the flange 142a of a tube 142 through which pass the electric conductors 122a connected with the hot negative electrode, constituted by the whole of elements 139, 140. An indium gasket 143, traversed by insulating sleeve 144, is provided between elements 141 and 142a. Bolts 147 serve to secure elements 116b, 141 and 142a together.

Finally, a metal plate 145 protects conductors 122a before their passage through gasket 143 and a tube 146 makes it possible to connect the inside of casing 116a with a pressure gauge (not shown) in order to measure the pressure inside the casing.

The generator unit of FIGS. 11 to 14 being disposed in a nuclear reactor, for instance in a swimming-pool reactor, or preferably constituting, together with several other similar units disposed according to the arrangement of FIG. 9 (elements 108 and 116 being replaced by elements 108a and 116a), the core of a power generating nuclear reactor, its operation, analogous to that of the unit of FIG. 10 is as follows:

The neutrons from the mass of uranium of the reactor, which is greater than the critical mass, produce a heating of the liquid 113a contained in chamber 110a. Furthermore, the aluminum support 131 is heated up under the effect of the gamma rays of the reactor and raises the temperature of the volume 133 of moderator liquid in communication, through channels 134, with that contained in chamber 110a.

Under the effect of this double heating, the moderator liquid 113a (generally water) starts boiling in chamber 110a, from which it escapes through nozzle 120a, cross-shaped member 114c acting as a throttling member controlling the flow of the boiling liquid. It will be noted that, during the operation, the volume 133 of liquid serves to prevent the formation of hot points at the lower part of container 108.

On the other hand, the great mass of nozzle 120a is heated by gamma rays and overheats the vapor flowing therethrough. Grid 137 retains the droplets of liquid which might be driven by the vapor escaping from chamber 110a. The dry overheated vapor escapes from nozzle 120a in the form of a vapor jet 115a which is strongly ionized by the radiations and particles from the nuclear reactor.

This vapor jet 115a, of low internal electric resistance, passes between a hot electrode, consisting of conductor wire 139, and a cooled electrode (on which the vapor condensates), consituted by the inner wall of casing 116a. The electrons of vapor jet 115a are slowed down in the vicinity of the cold inner wall of casing 116a and consequently charge this wall to a negative potential smaller in absolute value than that to which they charge the hot electrode 139, whereby an electromotive force is available between these electrodes and therefore between conductors 121a and 122a.

The vapor jet, which cannot reach conductors 122a serving to collect the current, due to the provision of plate 145, condensates on the cooled walls of casing 116a acting as a condenser and the condensed liquid drops back into chamber 111a from which it can return into chamber 110a through the holes 112a provided in partition 109a.

In all the embodiments above described a thin jet of ionized hot vapor (a flame is a particular case of a hot ionized vapor jet) moves between a hot electrode at a temperature lower than its thermionic emission temperature and a cold electrode at a temperature lower than the vapor condensation temperature and during the operation the cold electrode becomes positive with reference to the hot electrode. We thus obtain one or several tens of volts per pair of electrodes for a difference of temperature between the electrodes ranging from 200° C. to 300° C., this voltage being much higher than that obtained with thermocouples, even of the plasma type.

The static apparatus for converting thermal energy into electrical energy, according to the invention, has many advantages and in particular the following ones:

First its construction is simple and unexpensive.

It operates practically without maintenance and without supervision.

It does not require a magnetic field.

Its efficiency is high.

It permits of obtaining the desired high voltages.

In some embodiments of the invention, this converter may work with conventional sources of heat (gas or fuel oil burners) and is perfectly well adapted to areas where there is not much industrial equipment.

In other embodiments of the invention, it permits of recovering the energy carried along by the particles and the radiations produced in nuclear reactors, in particular of the swimming-pool type. It is even possible to provide for the whole of the fissionable layers a mass sufficient to constitute, together with heavy water (constituting the cooling fluid) acting as moderator, a nuclear reactor capable of directly supplying electrical power without having recourse to the usual cycle involving the heating on an intermediate fluid the energy of which is transformed into mechanical energy, in turn transformed into electrical energy.

It therefore permits direct transformation of nuclear energy into electrical energy with a high yield and in a very simple manner. It may work with a thermal reactor as well as with a fast reactor and in both cases it permits of utilizing a great portion of the heat energy produced by nuclear fission and also a great portion of the ionizing energy available in the reactor.

Finally it permits of obtaining an energy converting nuclear reactor of easy construction and reduced cost because it does not require the usual thermal cycle with heat exchangers and turbo-alternators.

In a general manner, while we have, in the above description, disclosed what we deem to be practical and efficient embodiments of the invention, it should be well understood that we do not wish to be limited thereto as there might be changes made in the arrangement, disposition and form of the parts without departing from the principle of the present invention as comprehended within the scope of the appended claims.

What we claim is:
1. A static apparatus for converting thermal energy into electrical energy which comprises, in combination, means for producing a plurality of hot thin streams of an ionized vapor, a pair of electrodes disposed at the periphery of each of said streams, each of said pairs comprising a non-cooled electrode and a cooled electrode, the non-cooled electrode of every pair, with the exception of that of the last pair, being immediately adjacent to the cooled electrode of the next pair, means for thermally insulating from each other said adjacent electrodes of two successive pairs, conductors for electrically connecting together the non-cooled electrode of every pair, with the exception of the last one, with the cooled electrode of the next pair, means for cooling each of said cooled electrodes to a temperature lower than the temperature of condensation of said vapor, said non-cooled electrodes being at a temperature in the range of 300° C. to 600° C. and means for collecting the voltage between the cooled electrode of the first pair and the non-cooled electrode of the last pair.

2. An apparatus according to claim 1 wherein said means for thermally insulating comprise a layer of a thermally insulating material between the non-cooled electrode of every pair, with the exception of that of the last pair, and the cooled electrode of the next pair.

3. An apparatus according to claim 1 wherein the means for producing a plurality of hot thin streams of ionized vapor comprise a vessel for feeding a fuel, said vessel being provided with a plurality of outlets, one for each of said streams.

4. A static apparatus for converting thermal energy into electrical energy which comprises, in combination, a nuclear reactor, a plurality of pairs of electrodes in said reactor, the two electrodes of each pair being disposed adjacent and side-by-side to each other so as to leave a passage of small thickness between them, a mass of an easily vaporizable and ionizable substance disposed in said reactor in a space in communication with each of said passages, means for cooling down only one of the electrodes of each of said pairs to a temperature lower than the temperature of condensation of said substance, the non-cooled electrode of each of said pairs, with the exception of that of the last pair, being located in the immediate vicinity of the cooled electrode of the next pair, means for thermally insulating from each other the non-cooled electrode of one pair and the cooled electrode of the next pair adjacent which it is located, means for electrically connecting the non-cooled electrode of every pair, with the exception of that of the last pair, with the cooled electrode of the next pair, a layer of a fissionable product forming a coating on the non-cooled electrode of each of said pairs, vaporization of said substance being obtained by the heating thereof by radiations from said reactor, heating of the second mentioned electrode of each of said pairs to a temperature in the range of 300° C. to 600° C. being produced by fission reactions induced in said layer by neutrons from said reactor, the vapor streams resulting from the vaporization of said substance being ionized by the ionizing particles and radiations from said reactor and from the fission reactions in said layers, and means for collecting a potential difference between the cooled electrode of the first of said pairs and the non-cooled electrode of the last of said pairs.

5. An apparatus according to claim 4 wherein said electrodes are disposed coaxially with one another about one which is centrally located, each of said electrodes with the exception of said central one being in the form of a glove finger.

6. An apparatus according to claim 4 wherein said means for cooling down are constituted by a mass of heavy water and wherein the active core of said nuclear reactor comprises the whole of said fissionable product layers and at least one portion of said heavy water forming also the moderator of said reactor.

7. A static apparatus for converting thermal energy into electrical energy, which comprises, in combination, a nuclear reactor comprising a plurality of generator units, each of said units including a container, partition means for dividing said container into two chambers, a first one and a second one, open at their upper ends and communicating together at their lower ends, a liquid in said container, an element containing at least at the surface thereof a fissionable material housed in the first of said chambers for heating and vaporizing said liquid therein so as to produce a jet of vapor, said vapor being ionized by the radiations and fission products given off by the fissionable substance of said element, a condenser covering the top of both of said chambers for condensing said jet of vapor and returning the condensed liquid into the second of said chambers, said condenser including a cold area which constitutes a cold electrode maintained at a temperature lower than the temperature of condensation of said vapor, the surface of the upper portion of said first chamber forming a hot electrode, heated to a temperature in the range of 300° C. to 600° C., two voltage collecting conductors connected with said two electrodes, respectively, and conductor means for connecting together said conductors of the respective units.

8. An apparatus according to claim 7 wherein said liquid is a moderator.

9. An apparatus according to claim 7 wherein said liquid is a metallic substance having a low melting point.

10. An apparatus according to claim 7 further comprising a mass of liquid surrounding all of said units.

11. An apparatus according to claim 7 comprising means for circulating a heat transfer fluid along the respective condensers of said units.

12. An apparatus according to claim 7 wherein said second chamber concentrically surrounds said first chamber.

13. An apparatus according to claim 7 wherein said two chambers are separated from each other by an alumina partition.

14. An apparatus according to claim 7 wherein said second chamber concentrically surrounds said first chamber, and a metal nozzle is located at the top of said first chamber to be heated by gamma rays from said nuclear reactor and for overheating the vapor formed in said first chamber.

15. An apparatus according to claim 14 wherein said hot electrode is carried by end of said nozzle through which the ionized vapor jet is issuing.

16. An apparatus according to claim 14 further comprising a layer of alumina on said nozzle.

17. The method of converting thermal energy into electrical energy comprising introducing a laminar flame containing a vaporized and ionized material between a plurality of pairs of electrodes, said electrodes of each pair being placed adjacent and side-by-side to each other, one of said electrodes of each pair being metallic and having good heat and electrical conductance, cooling said electrode to a temperature lower than the temperature of condensation of the vapor of said material, the other of said electrodes of each pair being of a material of low thermionic emission, maintaining said other electrode at a temperature higher than said temperature of condensation of said vapor in the range of 300° C. to 600° C., and collecting the potential difference between each pair of said electrodes.

18. The method of converting thermal energy into electrical energy which comprises disposing, in a nuclear reactor, at least one pair of electrodes adjacent and side-by-side to each other so as to leave a passage of small thickness between them, placing a mass of an easily vaporizable and ionizable material in said reactor in communication with the bottom of said passage, cooling one of said electrodes to a temperature lower than the temperature of condensation of the vapor of said material, the other of said other electrodes having a thin layer of fissionable material coated thereon, heating said coated electrode to a temperature in the range of 300° C. and 600° C., the vaporization of said mass of material being effected by radiations from said reactor and heating of said electrode being effected by fission reactions induced in said coating of fissionable material by neutrons from said reactor, the vapor stream resulting from the vaporization of said substance being ionized by the ionizing particles and radiations from said reactor and fission reactions in said coating, and collecting the potential difference between said electrodes.

19. A static apparatus for converting thermal energy into electrical energy which comprises in combination, a nuclear reactor comprising a plurality of generator units, each of said units including a container, partition means for dividing said container into a first and second chamber, open at their upper ends and communicating together at their lower ends, a liquid in said container, an element containing, at least at the surface thereof, a fissionable material housed in the first of said chambers for heating and vaporizing said liquid therein so as to produce a jet of vapor, said vapor being ionized by the radiations and fission products given off by said fissionable material of said element, a condenser at the top of said chambers for condensing said jet of vapor and returning the condensed liquid into the second of said chambers, the inner wall of said second chamber constituting a cold electrode, means for maintaining said cold electrode at a temperature lower than the temperature of condensation of said vapor, a wire electrode disposed at the periphery of said vapor jet forming a hot electrode, means for maintaining the temperature of said hot electrode in the range of 300° C. and 600° C., two voltage collecting conductors connected with said two electrodes and conductor means for connecting together said conductors of the respective units.

20. The method according to claim 18 wherein said cooled electrode is hollow, said electrode being cooled by circulating a cooling fluid therein.

21. The method according to claim 18 wherein said heated electrode is a cylindrical metal bar disposed inside the other electrode.

22. An apparatus according to claim 5 wherein the glove finger shaped non-cooled electrodes are metallic, said coating being made of a substance of the group comprising fissionable uranium and uranium compounds.

23. The method according to claim 18 wherein said easily vaporizable and ionizable substance consists of an alkali metal.

24. The method according to claim 18 wherein said easily vaporizable and ionizable substance consists of mercury.

References Cited by the Examiner

UNITED STATES PATENTS

| | | | |
|---|---|---|---|
| 2,759,112 | 8/1956 | Caldwell | 310—4 |
| 3,093,567 | 6/1963 | Jablonski et al. | 176—52 |
| 3,113,091 | 12/1964 | Rasor et al. | 176—37 |

FOREIGN PATENTS

| | | |
|---|---|---|
| 1,267,863 | 6/1961 | France. |

REUBEN EPSTEIN, *Primary Examiner.*

CARL D. QUARFORTH, *Examiner.*